United States Patent
Hihnala et al.

(10) Patent No.: US 9,655,372 B2
(45) Date of Patent: May 23, 2017

(54) CELLULOSE-BASED FOOD CASING AND METHOD OF MANUFACTURE

(71) Applicant: ViskoTeepak Belgium NV, Lommel (BE)

(72) Inventors: Esa Hihnala, Lohja (FI); Pontus Froman, Hanko (FI)

(73) Assignee: ViskoTeepak Belgium NV, Lommel (BE)

( * ) Notice: Subject to any disclaimer, the term of this patent is extended or adjusted under 35 U.S.C. 154(b) by 0 days.

(21) Appl. No.: 13/778,360

(22) Filed: Feb. 27, 2013

(65) Prior Publication Data

US 2014/0242308 A1 Aug. 28, 2014

(51) Int. Cl.
*A22C 13/00* (2006.01)

(52) U.S. Cl.
CPC ..... *A22C 13/0013* (2013.01); *Y10T 428/1324* (2015.01)

(58) Field of Classification Search
CPC .......... Y10T 428/139; Y10T 428/1324; Y10T 428/1393; Y10T 428/1397; A22C 13/00; A22C 13/0013
USPC ......... 426/92, 135, 138, 105, 106; 428/34.8, 428/35.6, 36, 36.9, 36.91, 34.1, 34.2, 348; 206/802
See application file for complete search history.

(56) References Cited

U.S. PATENT DOCUMENTS

| | | | |
|---|---|---|---|
| 3,135,613 A * | 6/1964 | Underwood | 138/118.1 |
| 3,898,348 A * | 8/1975 | Chiu et al. | 426/413 |
| 4,198,325 A | 4/1980 | Hammer et al. | |
| 4,756,914 A * | 7/1988 | Jon et al. | 426/132 |
| 5,104,486 A | 4/1992 | Sweeney | |
| 5,230,933 A * | 7/1993 | Apfeld et al. | 428/34.8 |
| 6,372,361 B1 * | 4/2002 | Mackewicz et al. | 428/537.5 |
| 6,667,082 B2 | 12/2003 | Bamore et al. | |
| 6,703,058 B1 * | 3/2004 | Hammer et al. | 426/135 |
| 2002/0015769 A1 * | 2/2002 | Krallmann | A22C 13/0013 426/277 |
| 2003/0031765 A1 * | 2/2003 | Luthra et al. | 426/129 |
| 2007/0102130 A1 * | 5/2007 | Satyavolu et al. | 162/179 |
| 2007/0160716 A1 * | 7/2007 | Theisen et al. | 426/106 |
| 2008/0057235 A1 | 3/2008 | Foegler et al. | |
| 2010/0015299 A1 * | 1/2010 | Borst et al. | 426/106 |
| 2010/0129642 A1 * | 5/2010 | Grondahl | C08J 5/18 428/324 |
| 2011/0167723 A1 | 7/2011 | Whitehead | |
| 2012/0052223 A1 | 3/2012 | Wielockx et al. | |
| 2013/0344265 A1 | 12/2013 | Pohl et al. | |

FOREIGN PATENT DOCUMENTS

| | | |
|---|---|---|
| EP | 1314822 A1 * | 5/2003 |
| GB | 1287286 | 8/1972 |
| GB | 2148910 | 6/1985 |
| JP | S53133649 A | 11/1978 |
| JP | S63296647 A | 12/1988 |
| JP | 2002119200 A | 4/2002 |
| JP | 2010511796 A | 4/2010 |
| WO | WO2008066487 A1 | 6/2008 |

OTHER PUBLICATIONS

Hubble, Martin A. Paper's Resistance to Wetting—A Review of Internal Sizing Chemicals and Their Effects, BioResources 2(1), pp. 112-113, available online at https://www.ncsu.edu/bioresources/BioRes_02/BioRes_02_1_106_145_Hubbe_Sizing_of_Paper_Review.pdf.*

Product Information—Nalo Top, Kalle Group, Published in or before Feb. 2013, 2 pages.

Notice of Reasons for Rejection, Japanese Patent Office, JP Application Serial No. JP2013-037777, Nov. 15, 2016, 4 pages.

* cited by examiner

*Primary Examiner* — Lee E Sanderson
(74) *Attorney, Agent, or Firm* — Fish & Richardson P.C.

(57) ABSTRACT

The invention relates to a cellulose-based food casing comprising alkenyl succinic anhydride and a method for the manufacture of said cellulose-based food casing.

12 Claims, No Drawings

CELLULOSE-BASED FOOD CASING AND METHOD OF MANUFACTURE

FIELD OF THE INVENTION

This document relates to a food casing, more particularly a cellulose-based food casing, comprising agents improving their properties. This document also relates to a method of production of said food casing.

BACKGROUND OF THE INVENTION

Food casings based on cellulose have been used for decades for the production of e.g. raw sausages, dry sausages and semi-dry sausages.

In the manufacture of processed sausage products, a meat emulsion is prepared from comminuted meat together with fillers, seasonings etc. A tubular food casing, such as one containing non-edible cellulose, may be loaded onto the stuffing horn of a filling machine and stuffed with meat emulsion. Depending on the type of sausage product, the casing may be twisted, tied or clipped into suitable size, or formed into chubs or sticks, and further processed.

Dry or semi-dry sausages, occasionally referred to as cervelats or summer sausages, are larger sausage products and include such representative examples as air dried pepperoni, soft salami, hard salami and dry salami, and the like. This type of sausage has reduced moisture content, and its preparation usually includes drying as one step of its manufacture. A dry sausage may also be smoked. Cooking may also be performed in some instances in the smoking step. Some sausages may be fermented during their processing.

There are significant variations in the compositions of the meat emulsions used affecting the processing and the final product. Further, the size of the sausage product and consequently the size, e.g. diameter, of the food casing may vary greatly. There are also variations in the ripening and respective drying cycles to reach a final protein to fat ratio and/or moisture to protein ratio. Ripening and drying is characterized by weight loss ranging from approx. 10 to 30%, which is associated with a reduction in volume and mainly radial shrinkage.

Due to the above reasons, it may be challenging to optimize the production of dry or semi-dry and other sausage products. The drying and/or ripening rate is important. The food casing should adhere sufficiently to the sausage or meat emulsion to avoid grease or oil spot formation between the sausage or meat emulsion and the food casing. The adverse phenomenon where grease or oil spots are formed between the sausage or meat emulsion and the food casing is often called greasing out. In addition to being unsightly, greasing out also reduces the rate of ripening and/or drying. Greasing out may also have adverse effects at peeling, because the grease or oil may increase adherence of the meat emulsion to the food casing.

Furthermore, the food casing should adhere to an extent that allows peeling off the casing using different peeling procedures, including e.g. manual or fast speed automatic peeling. Automatic peeling apparatuses and methods have been developed for large scale production of sausage products. For instance, known are apparatuses having mechanisms for inflating the casing with pressurized air, for removing the end caps of the casing, for slitting and removing the casing from the sausage product, and for positioning the sausage products for these operations. Efficient and fast processing of sausage products, e.g. pork and pepperoni sausages, requires the use of higher production temperatures, which may result in significant greasing out. Naturally, productivity in the production of sausage products should be maintained at an acceptable level for economical reasons.

Several methods and chemical agents have been proposed for improving, i.e. increasing or reducing, adhesion of a food casing to proteins, meat emulsions or sausage products, and for allowing suitable release and peeling of the food casing.

However, these approaches may have various limitations and drawbacks. For instance, fluctuation due to variation in the amount of fibre on the inside surface of a cellulose-based food casing depending on the degree of viscose penetration may result in overly high adhesion, particularly for sausage types requiring the combination of high weight loss during ripening and drying and fast or automatic peeling.

The use of chemical agents, for instance internal impregnation or coating of a food casing with an adhesion promoting agent and/or a release agent, may be difficult to optimize. For instance, the agents may be incompatible (e.g. in terms of hydrophilicity) and thus require additional components as emulsifiers; the agents may be costly or not well suitable for use in food applications; or it may be difficult to find a suitable balance between the agents and the desired characteristics of the food casing. Furthermore, the agents may be susceptible to varying conditions due to chemical or mechanical steps during the manufacture of the food casing, or there may be fluctuations in the amount of the agents in the food casing, leading to inconsistencies in the food casings or manufactured batches thereof and their performance during the manufacture of the sausage product.

Purpose of the Invention

The purpose of the invention is to provide a food casing, in particular a cellulose-based food casing.

SUMMARY

The invention relates to a cellulose-based food casing comprising alkenyl succinic anhydride.

In one embodiment, the cellulose-based food casing is tubular.

In one embodiment, the cellulose-based food casing comprises regenerated cellulose.

In one embodiment, the cellulose-based food casing comprises a fibrous reinforcement.

In one embodiment, the cellulose-based food casing comprises a fibrous reinforcement comprising an inside surface and an outside surface; and an outside layer on the outside surface of the fibrous reinforcement and/or an inside layer on the outside surface of the fibrous reinforcement; and the outside layer and/or the inside layer comprises regenerated cellulose.

In one embodiment, the cellulose-based food casing is a single layer viscose casing or a double layer viscose casing.

In one embodiment, the cellulose-based food casing comprises an inside layer including alkenyl succinic anhydride.

In one embodiment, the cellulose-based food casing comprises an inside surface and an outside surface; and the inside surface and/or the outside surface of the cellulose-based food casing is coated with alkenyl succinic anhydride.

In one embodiment, alkenyl succinic anhydride is impregnated in the inside layer and/or the outside layer of the cellulose-based food casing.

In one embodiment, alkenyl succinic anhydride is C8, C9, C10, C11, C12, C13, C14, C15, C16, C17, C18, C19, C20, C21, C22, C23, or C24-alkenyl succinic anhydride, or any mixture thereof.

In one embodiment, the amount of alkenyl succinic anhydride in the cellulose-based food casing is up to about 1% by weight based on the total dry weight of regenerated cellulose contained in the cellulose-based food casing.

In one embodiment, the cellulose-based food casing further comprises a stabilizing agent.

In one embodiment, the cellulose-based food casing further comprises a stabilizing agent such as starch, pectin, silica, one or more polyacrylamides, bentonite, one or more carboxymethyl celluloses, polyvinyl amine, polyvinyl alcohol, poly diallyl dimethyl ammonium chloride, galactoglucomannan, or polyamidoamine-epichlorohydrin.

In one embodiment, the stabilizing agent is selected from the group consisting of starch, pectin, silica, one or more polyacrylamides, bentonite, one or more carboxymethyl celluloses, polyvinyl amine, polyvinyl alcohol, poly diallyl dimethyl ammonium chloride, galactoglucomannan, and polyamidoamine-epichlorohydrin.

In one embodiment, the cellulose-based food casing further comprises a peeling agent.

The invention also relates to a method for the manufacture of the cellulose-based food casing according to the invention, which method comprises the step of impregnating or coating a cellulose-based food casing with a solution comprising alkenyl succinic anhydride.

In one embodiment, the cellulose-based food casing is impregnated with a solution comprising alkenyl succinic anhydride admixed with regenerated cellulose.

In one embodiment, the method comprises the steps of a) admixing alkenyl succinic anhydride with regenerated cellulose to form a solution;

b) preparing a cellulose-based food casing by impregnating the inside surface and/or outside surface of a fibrous reinforcement with the solution obtainable from step a); and c) coagulating and washing the cellulose-based food casing obtainable from step b).

In one embodiment, the amount of alkenyl succinic anhydride in the solution comprising alkenyl succinic anhydride admixed with regenerated cellulose is up to about 1% by weight based on the total dry weight of regenerated cellulose.

In one embodiment, a cellulose-based food casing is coated with a solution comprising alkenyl succinic anhydride.

In one embodiment, the method comprises the steps of a) preparing a cellulose-based food casing by impregnating the inside surface and/or outside surface of a fibrous reinforcement with regenerated cellulose;

b) coagulating and washing the cellulose-based food casing obtainable from step a); and c) coating the inside surface and/or the outside surface of the cellulose-based food casing obtainable from step b) with a solution comprising alkenyl succinic anhydride.

In one embodiment, the method further comprises the step of d) drying and/or curing the cellulose-based food casing.

In one embodiment, step c) comprises coating the inside surface of the cellulose-based food casing with the solution comprising alkenyl succinic anhydride by internal bubble coating.

In one embodiment, the concentration of alkenyl succinic anhydride in the solution comprising alkenyl succinic anhydride is in the range of about 1 to about 15 g/l.

In one embodiment, the concentration of alkenyl succinic anhydride in the solution comprising alkenyl succinic anhydride is in the range of about 1 to about 4 g/l.

In one embodiment, the concentration of alkenyl succinic anhydride in the solution comprising alkenyl succinic anhydride is in the range of about 4 to about 12 g/l.

In one embodiment, the solution comprising alkenyl succinic anhydride further comprises a stabilizing agent.

In one embodiment, the solution comprising alkenyl succinic anhydride further comprises a stabilizing agent such as starch, pectin, silica, one or more polyacrylamides, bentonite, one or more carboxymethyl celluloses, polyvinyl amine, polyvinyl alcohol, poly diallyl dimethyl ammonium chloride, galactoglucomannan, or polyamidoamine-epichlorohydrin.

In one embodiment, the solution comprising alkenyl succinic anhydride further comprises a stabilizing agent selected from the group consisting of starch, pectin, silica, one or more polyacrylamides, bentonite, one or more carboxymethyl celluloses, polyvinyl amine, polyvinyl alcohol, poly diallyl dimethyl ammonium chloride, galactoglucomannan, and polyamidoamine-epichlorohydrin.

In one embodiment, the stabilizing agent is starch.

In one embodiment, the stabilizing agent is cationic starch.

In one embodiment, the concentration of starch in the solution comprising alkenyl succinic anhydride is in the range of about 0.4 to about 6 g/l.

In one embodiment, the concentration of starch in the solution comprising alkenyl succinic anhydride is in the range of about 0.4 to about 1.7 g/l.

In one embodiment, the concentration of starch in the solution comprising alkenyl succinic anhydride is in the range of about 1.6 to about 4.8 g/l.

The invention further relates to a cellulose-based food casing obtainable by the method according to the invention.

DETAILED DESCRIPTION

Reference will now be made in detail to the embodiments of the present invention.

A cellulose-based food casing according to one or more embodiments of the invention offers a better balance between adherence and release properties, meets one or more of the above requirements and at the same time provides an economic solution in terms of sausage product productivity.

In this context, the term "alkenyl succinic anhydride" or "ASA" should be understood as meaning a compound composed of an unsaturated alkenic hydrocarbon backbone coupled to succinic anhydride. The number of carbon atoms in the alkenic hydrocarbon backbone may be in the range of 8 to 24. In some embodiments, the number of carbon atoms in the alkenic hydrocarbon backbone may be in the range of 14 to 20. Thus in this context, the term "C18-alkenyl succinic anhydride" should be understood as referring to alkenyl succinic anhydride comprising an alkenic hydrocarbon backbone having 18 carbon atoms.

Any form of alkenyl succinic anhydride selected from the group consisting of C8, C9, C10, C11, C12, C13, C14, C15, C16, C17, C18, C19, C20, C21, C22, C23, C24-alkenyl succinic anhydride, and any mixture thereof, may be used.

Alkenyl succinic anhydride as described above is available as pure compounds and mixtures as commercial products having a purity ranging from e.g. 90% to 100%.

The term "alkenyl succinic anhydride" or "ASA" may therefore also be understood as referring to two or more alkenyl succinic anhydride compounds and any mixtures thereof.

In this context, the term "cellulose-based food casing" should be understood as referring to a casing suitable for food.

In one embodiment, the cellulose-based food casing is suitable for production of meat products such as sausages. The cellulose-based food casing described herein is in principle suitable for production of any type of sausage. It is highly suitable for the production of US style pepperoni sausages.

In one embodiment, the cellulose-based food casing is tubular.

Cellulose-based food casings may have varying sizes and diameters, depending on e.g. the type of sausage product for which they are suitable, and/or other required characteristics.

In one embodiment, the cellulose-based food casing comprises regenerated cellulose.

In this context, the term "regenerated cellulose" should be understood as referring to cellulose regenerated from viscose. In one embodiment, viscose is xanthate type viscose. However, while xanthate type viscose is commonly used, it is to be understood that viscose may also refer to cellulose having similar characteristics produced by any other technology for dissolving and extruding cellulose, including e.g. aminomethanate viscose (also known as carbamate or aminomethanate viscose and cupraammonium type viscose) as well as any solution based on non-derivatized cellulose, such as cellulose-tertiary amine oxide (NMMO) solutions and solutions based on ionic liquids.

In one embodiment, the cellulose-based food casing comprises a fibrous reinforcement. This embodiment has the added utility that the fibrous reinforcement may provide mechanical strength or reinforcement to the cellulose-based food casing.

In this context, the term "fibrous reinforcement" should be understood as referring to fibrous material that is capable of mechanically reinforcing the cellulose-based food casing. In one embodiment, the fibrous reinforcement is a paper made from a strong cellulose fibre. Various types of cellulose fibre may be used, e.g. natural cellulose fibre such as hemp, but also a synthetic fibre, e.g. regenerated cellulose fibre in the form of rayon, may be used. In other embodiments, the fibrous reinforcement may be e.g. a woven sheet or web formed from a strong cellulose fibre.

In one embodiment, the fibrous reinforcement is tubular.

In one embodiment, the cellulose-based food casing comprises a fibrous reinforcement and an inside layer comprising regenerated cellulose.

In one embodiment, the cellulose-based food casing comprises a fibrous reinforcement and an outside layer comprising regenerated cellulose.

In one embodiment, the cellulose-based food casing comprises a fibrous reinforcement and an inside layer and an outside layer comprising regenerated cellulose.

These embodiments may be prepared e.g. by impregnating a fibrous reinforcement comprising an inside surface and an outside surface with regenerated cellulose, for instance viscose, by applying regenerated cellulose on the inside surface, on the outside surface, or the inside surface and the outside surface of the fibrous reinforcement. In other words, an inside layer and/or an outside layer of the cellulose-based food casing is formed by regenerated cellulose impregnated on the inside surface and/or the inside surface of the fibrous reinforcement.

Cellulose-based food casings comprising regenerated cellulose may be coagulated after application of regenerated cellulose e.g. in an acid bath. Cellulose-based food casings that have been coagulated may be further processed by washing steps.

In one embodiment, the cellulose-based food casing is a single layer viscose casing. In this context, the term "single layer viscose casing" or "SVC" should be understood as referring to a cellulose-based food casing comprising a fibrous reinforcement and an outside layer or an inside layer comprising regenerated cellulose. In other words, a single layer viscose casing comprises a fibrous reinforcement comprising an inside surface and an outside surface, wherein the inside surface or the outside surface is impregnated with viscose by applying viscose to either the inside surface or the outside surface of the fibrous reinforcement only. This embodiment has the added utility that it is relatively simple and cost-effective to manufacture.

In one embodiment, a single layer viscose casing comprises a fibrous reinforcement and an outside layer comprising regenerated cellulose. In other words, in one embodiment of a single layer viscose casing, a fibrous reinforcement comprising an inside surface and an outside surface is impregnated with viscose by applying viscose to the outside surface of the fibrous reinforcement only.

In one embodiment, the single layer viscose casing is tubular.

In one embodiment, the cellulose-based food casing is a single layer viscose casing comprising an inside surface and an outside layer comprising regenerated cellulose; and alkenyl succinic anhydride is impregnated in the inside surface.

In one embodiment, the cellulose-based food casing is a double layer viscose casing. In this context, the term "double layer viscose casing" or "DVC" should be understood as referring to a cellulose-based food casing comprising an inside layer, an outside layer and a fibrous reinforcement between the outside layer and inside layer, wherein the outside layer and inside layer comprise regenerated cellulose. In other words, a double layer viscose casing comprises a fibrous reinforcement impregnated with viscose by applying viscose to both sides of the fibrous reinforcement. This embodiment has the added utility that it is mechanically relatively strong and thus can withstand well processing steps that cause stretching of the cellulose-based food casing.

In one embodiment, the double layer viscose casing is tubular.

In one embodiment, the cellulose-based food casing is a double layer viscose casing comprising an inside layer, an outside layer and a fibrous reinforcement between the outside layer and inside layer, wherein the outside layer and inside layer comprise regenerated cellulose; and wherein alkenyl succinic anhydride is impregnated in the inside layer.

In one embodiment, the cellulose-based food casing is coated with alkenyl succinic anhydride. In other words, in this embodiment, alkenyl succinic anhydride is applied to the cellulose-based casing by coating the cellulose-based casing with a solution comprising alkenyl succinic anhydride. The coating may be performed e.g. by submerging or dipping the cellulose-based food casing into a solution comprising alkenyl succinic anhydride, or by internal bubble coating technology known in the art, or by any other technique that allows distribution of alkenyl succinic anhydride to the cellulose-based food casing or the inside surface or the outside surface thereof.

In one embodiment, the cellulose-based food casing comprises an inside surface and an outside surface; and the inside surface of the cellulose-based food casing is coated with a solution comprising alkenyl succinic anhydride.

In one embodiment, the cellulose-based food casing comprises an inside surface and an outside surface; and the outside surface of the cellulose-based food casing is coated with a solution comprising alkenyl succinic anhydride.

In one embodiment, the cellulose-based food casing comprises an inside surface and an outside surface; and the inside surface and the outside surface of the cellulose-based food casing is coated with a solution comprising alkenyl succinic anhydride.

Embodiments in which the inside surface or inside layer of the cellulose-based food casing is coated with a solution comprising alkenyl succinic anhydride, or in which the inside layer of the cellulose-based food casing is impregnated with a solution comprising alkenyl succinic anhydride, have the added utility that the presence of alkenyl succinic anhydride on the inside surface or inside layer may be sufficient to provide its effect; including alkenyl succinic anhydride in other parts of the cellulose-based food casing, e.g. the outside surface or outside layer, may not be necessary.

The alkenyl succinic anhydride may be present in the cellulose-based food casing in either bound or non-bound form. In this context, the term "bound" should be understood as meaning bound to cellulose by a covalent bond. In other words, bound alkenyl succinic anhydride has reacted chemically with the cellulose present in a cellulose-based food casing.

In one embodiment, the amount of alkenyl succinic anhydride in the cellulose-based food casing is up to about 1% by weight based on the total dry weight of regenerated cellulose contained in the cellulose-based food casing. This amount includes alkenyl succinic anhydride both in bound and in non-bound form.

In one embodiment, the amount of alkenyl succinic anhydride in the cellulose-based food casing is up to about 0.75%; or up to about 0.5%; or up to 0.25%; or up to 0.1%; or up to 0.06% by weight based on the total dry weight of regenerated cellulose contained in the cellulose-based food casing.

In one embodiment, the amount of alkenyl succinic anhydride in the cellulose-based food casing is in the range of about 0.001% to about 1% by weight based on the total dry weight of regenerated cellulose contained in the cellulose-based food casing.

In one embodiment, the amount of alkenyl succinic anhydride in the cellulose-based food casing is in the range of about 0.001% to about 0.75% by weight based on the total dry weight of regenerated cellulose contained in the cellulose-based food casing; or in the range of about 0.001% to about 0.5%; or in the range of about 0.001% to about 0.25%; or in the range of about 0.001% to about 0.1%; or in the range of about 0.001% to about 0.06%.

The amount of alkenyl succinic anhydride in the cellulose-based food casing may depend e.g. on the parts of the cellulose-based food casing in which it is present. If the alkenyl succinic anhydride is present only in some parts of the cellulose-based food casing, e.g. as a coating on the inside surface or impregnated in the inside layer of the cellulose-based food casing, the amount of alkenyl succinic anhydride may be lower than if it is spread throughout the cellulose-based food casing.

The amount of alkenyl succinic anhydride in the cellulose-based food casing may be measured using known methods, e.g. by extracting bound and non-bound alkenyl succinic anhydride and measuring them using a combination of gas chromatography and mass spectrometric detection.

The amount of alkenyl succinic anhydride may be adjusted in different embodiments of the cellulose-based food casing so as to provide optimal release and other properties in the production of sausage products, depending on various parameters, such as the type of sausage product produced, other features of the cellulose-based food casing, for instance the amount of cellulose and/or regenerated cellulose present in the cellulose-based food casing, and the parameters of the cooking, ripening and/or drying steps of the sausage product production.

Typically, a large amount of alkenyl succinic anhydride may provide a greater extent of pre-release or pre-release at an earlier time point during the ripening and/or drying of a sausage product, while a low amount of alkenyl succinic anhydride may provide a smaller extent of pre-release or pre-release at a later time point during the ripening and/or drying of a sausage product.

On the other hand, a large amount of alkenyl succinic anhydride may, in some embodiments, provide a very large extent of pre-release or full pre-release at an early time point during the ripening and/or drying of a sausage product. Such excessive pre-release may be inoptimal and e.g. may not allow automatic peeling. Furthermore, a large extent of pre-release or full pre-release at an early time point may reduce the rate of ripening and/or drying. In applications in which pre-release or full pre-release is not desired, the amount of alkenyl succinic anhydride in the cellulose-based food casing may be adjusted accordingly.

The amount of alkenyl succinic anhydride may, in some embodiments, also be selected so as to provide reduced greasing out but a small extent of pre-release.

Prior to impregnation or coating to a cellulose-based food casing, alkenyl succinic anhydride may be formulated in aqueous solution. The impregnation or coating may be performed as described below.

Prior to impregnation or coating of a cellulose-based food casing, alkenyl succinic anhydride may be formulated with a stabilizing agent. In this context, the term "a stabilizing agent" should be understood as referring to one or more stabilizing agents. A stabilizing agent may refer to any compound or composition that is capable of stabilizing and/or emulsifying alkenyl succinic anhydride in solution, e.g. aqueous solution. The stabilizing agent may also allow for particle formation suitable for impregnating or coating the cellulose-based food casing with alkenyl succinic anhydride. A stabilizing agent may be selected from, but is not limited to, starch, pectin, silica, one or more polyacrylamides, bentonite, one or more carboxymethyl celluloses, polyvinyl amine, polyvinyl alcohol, poly diallyl dimethyl ammonium chloride, galactoglucomannan, and polyamidoamine-epichlorohydrin. The presence of a stabilizing agent has the added utility that it stabilizes and/or emulsifies alkenyl succinic anhydride, which may otherwise be poorly soluble, and allows for efficient impregnation or coating of alkenyl succinic anhydride.

In one embodiment, the stabilizing agent is starch.

In this context, the term "starch" should be understood as referring to various types of starches suitable for emulsion stabilization and solutions thereof.

Starch may be considered to include, as non-limiting examples only, starches obtained from plants such as potato, tapioca, corn, waxy maize, or wheat, or other natural sources of starch. Starches may also be of synthetic origin.

The composition of starch may differ depending on the source in terms of e.g. the proportions of straight (amylose) and branched (amylopectin) chains and chain length.

In one embodiment, starch is chemically or enzymatically modified. Various different chemical or enzymatic modifications are known to a skilled person.

In one embodiment, starch is chemically modified by etherification, esterification or crosslinking.

In one embodiment, starch is an amphoteric (i.e. anionic or cationic charge, based on pH) derivative.

In one embodiment, starch is cationic starch.

In one embodiment, starch is cationic starch produced by etherification of starch using an epoxy reagent containing a quaternary ammonium group.

In one embodiment, starch is depolymerized.

In one embodiment, starch is depolymerized by conversion, oxidation, hydrolysis or pyroconversion.

Various different starches are commercially available. Commercially available starches may further comprise small amounts of other components, e.g. components originating from the source of the starch such as a plant.

Embodiments in which alkenyl succinic anhydride is formulated with starch have the added utility that starch stabilizes and/or emulsifies alkenyl succinic anhydride in solution. Starch is also inexpensive and readily available.

The exact ratio of alkenyl succinic anhydride to a stabilizing agent is not critical, provided that it allows for particle formation with a particle size suitable for impregnation or coating of alkenyl succinic anhydride in the cellulose-based food casing. For example, if starch is used as a stabilizing agent, the ratio of alkenyl succinic anhydride to starch may be, but is not limited to, 1:2; or in the range of 1:1 to 20:1; or in the range of 1:1 to 2:1; or in the range of 1:1 to 4:1; or in the range of 0.5:1 to 40:1.

In various embodiments, the cellulose-based food casing may further comprise a peeling agent. In this context, the term "peeling agent" should be understood as referring to a chemical agent that is capable of controlling and/or reducing peeling forces required for removing a cellulose-based food casing from a sausage product. In this context, the term "a peeling agent" should also be understood as referring to one or more peeling agents. A peeling agent may be selected from, but is not limited to, paraffin, paraffin wax, alkylketene dimer and polyalkylene glycol. A peeling agent agent may be comprised in the outside layer, inside layer, outside surface and/or inside surface of a cellulose-based food casing. These embodiments have the added utility that a peeling agent agent may further optimize or alter peeling characteristics of a cellulose-based food casing.

The invention also relates to a method for producing the cellulose-based food casing according to the invention, which method comprises the step of impregnating or coating a cellulose-based food casing with a solution comprising alkenyl succinic anhydride.

In one embodiment, the cellulose-based food casing is impregnated with a solution comprising alkenyl succinic anhydride admixed with regenerated cellulose.

In this embodiment, alkenyl succinic anhydride is injected into the solution comprising regenerated cellulose before the solution is impregnated into the fibrous reinforcement and before the cellulose-based food casing is regenerated or coagulated. This embodiment has the added utility that alkenyl succinic anhydride may be very evenly distributed in the cellulose-based food casing. Furthermore, a constant level of alkenyl succinic anhydride is applied to the cellulose-based food casing.

In one embodiment, the method comprises the steps of
a) admixing alkenyl succinic anhydride with regenerated cellulose to form a solution;
b) preparing a cellulose-based food casing by impregnating the inside surface and/or outside surface of a fibrous reinforcement with the solution obtainable from step a); and
c) coagulating and washing the cellulose-based food casing obtainable from step b).

In one embodiment, the amount of alkenyl succinic anhydride in the solution comprising alkenyl succinic anhydride admixed with regenerated cellulose is up to about 1% by weight based on the total dry weight of regenerated cellulose.

In one embodiment, the amount of alkenyl succinic anhydride in the solution comprising alkenyl succinic anhydride admixed with regenerated cellulose is up to about 0.75%; or up to about 0.5%; or up to 0.25%; or up to 0.1%; or up to 0.06% by weight based on the total dry weight of regenerated cellulose.

In one embodiment, the amount of alkenyl succinic anhydride in the solution comprising alkenyl succinic anhydride admixed with regenerated cellulose is in the range of about 0.001% to about 1% by weight based on the total dry weight of regenerated cellulose.

In one embodiment, the amount of alkenyl succinic anhydride in the solution comprising alkenyl succinic anhydride admixed with regenerated cellulose is in the range of about 0.001% to about 0.75% by weight based on the total dry weight of regenerated cellulose; or in the range of about 0.001% to about 0.5%; or in the range of about 0.001% to about 0.25%; or in the range of about 0.001% to about 0.1%; or in the range of about 0.001% to about 0.06%.

In one embodiment, a cellulose-based food casing is coated with a solution comprising alkenyl succinic anhydride.

In one embodiment, the method comprises the steps of
a) preparing a cellulose-based food casing by impregnating the inside surface and/or outside surface of a fibrous reinforcement with regenerated cellulose;
b) coagulating and washing the cellulose-based food casing obtainable from step a); and
c) coating the inside surface of the cellulose-based food casing obtainable from step b) with a solution comprising alkenyl succinic anhydride.

In one embodiment, the method further comprises the step of d) curing the cellulose-based food casing.

In one embodiment, the method further comprises the step of d) curing and drying the cellulose-based food casing.

The present inventors have found that curing the cellulose-based food casing comprising alkenyl succinic anhydride is in many embodiments not necessary, thus allowing fast and economic manufacture of the cellulose-based food casing.

In one embodiment, the method further comprises the step of d) drying the cellulose-based food casing.

In one embodiment, the method does not comprise a step d) of curing the cellulose-based food casing.

Coating the inside surface of the cellulose-based food casing with the solution comprising alkenyl succinic anhydride may be done by e.g. internal bubble coating, the technique of which is known in the art, or e.g. by dipping the cellulose-based food casing in the solution comprising alkenyl succinic anhydride.

In one embodiment, the concentration of alkenyl succinic anhydride in the solution comprising alkenyl succinic anhydride is in the range of 1 to 15 g/l.

In one embodiment, the concentration of alkenyl succinic anhydride in the solution comprising alkenyl succinic anhydride is in the range of about 1 to about 15 g/l.

In one embodiment, the concentration of alkenyl succinic anhydride in the solution comprising alkenyl succinic anhydride is in the range of 1 to 4 g/l.

In one embodiment, the concentration of alkenyl succinic anhydride in the solution comprising alkenyl succinic anhydride is in the range of about 1 to about 4 g/l.

In one embodiment, the concentration of alkenyl succinic anhydride in the solution comprising alkenyl succinic anhydride is in the range of 4 to 12 g/l.

In one embodiment, the concentration of alkenyl succinic anhydride in the solution comprising alkenyl succinic anhydride is in the range of about 4 to about 12 g/l.

In one embodiment, the solution comprising alkenyl succinic anhydride further comprises a stabilizing agent as defined above.

In one embodiment, the stabilizing agent is starch.

In one embodiment, the concentration of starch in the solution comprising alkenyl succinic anhydride is in the range of 0.4 to 6 g/l.

In one embodiment, the concentration of starch in the solution comprising alkenyl succinic anhydride is in the range of about 0.4 to 6 g/l.

In one embodiment, the concentration of starch in the solution comprising alkenyl succinic anhydride is in the range of 0.4 to 1.7 g/l.

In one embodiment, the concentration of starch in the solution comprising alkenyl succinic anhydride is in the range of about 0.4 to about 1.7 g/l.

In one embodiment, the concentration of starch in the solution comprising alkenyl succinic anhydride is in the range of 1.6 to 4.8 g/l.

In one embodiment, the concentration of starch in the solution comprising alkenyl succinic anhydride is in the range of about 1.6 to about 4.8 g/l.

In this context, the concentrations of starch in the solution indicate the amount of dry starch per liter of solution, i.e. as dry weight in grams or % per liter.

The invention further relates to the use of alkenyl succinic anhydride for controlling release properties of a cellulose-based food casing.

The invention further relates to the use of alkenyl succinic anhydride for controlling and/or inducing pre-release of a cellulose-based food casing.

The invention further relates to the use of alkenyl succinic anhydride for controlling and/or reducing peeling forces required for removing a cellulose-based food casing from a sausage product.

The present inventors have surprisingly found that the presence of alkenyl succinic anhydride in a cellulose-based food casing can favourably influence adherence and release characteristics of the cellulose-based food casing.

The presence and the amount of alkenyl succinic anhydride in the cellulose-based food casing influences the extent of pre-release during ripening and/or drying of a sausage product. Further, the presence and the amount of alkenyl succinic anhydride in the cellulose-based food casing influences the timing of pre-release during ripening and/or drying of a sausage product.

The presence of alkenyl succinic anhydride in a cellulose-based food casing may significantly reduce peeling forces required to remove the cellulose-based food casing from a sausage product.

Because of the large extent and/or optimal timing of pre-release, reduced peeling forces are required to remove the cellulose-based food casing according to the present invention from a sausage product. Thus the cellulose-based food casing according to the present invention allows for fast peeling using e.g. automatic peeling equipment. Thus the cellulose-based food casing according to the present invention may be particularly suitable for large-scale production of sausage products in which automatic peeling is necessary.

Furthermore, the presence of alkenyl succinic anhydride in a cellulose-based food casing may significantly reduce greasing out during ripening and/or drying of a sausage product. Reduced greasing out may also significantly improve the efficiency of the ripening and/or drying process of a sausage product.

The present inventors have also found that a cellulose-based food casing comprising alkenyl succinic anhydride may perform very consistently. Alkenyl succinic anhydride does not appear to be particularly sensitive to minor fluctuations in conditions such as pH during the manufacture of the cellulose-based food casing, thus leading to a cellulose-based food casing that may be uniform e.g. within and between batches.

Furthermore, in many cases, a separate, possible time-consuming, curing step is not required for cellulose-based food casings comprising alkenyl succinic anhydride.

The invention further relates to embodiments described in the following paragraphs.

1. A cellulose-based food casing comprising alkenyl succinic anhydride.

2. A cellulose-based food casing according to paragraph 1, wherein the cellulose-based food casing is tubular.

3. A cellulose-based food casing according to paragraph 1 or 2, wherein the cellulose-based food casing comprises regenerated cellulose.

4. A cellulose-based food casing according to any one of paragraphs 1-3, wherein the cellulose-based food casing comprises a fibrous reinforcement.

5. A cellulose-based food casing according to any one of paragraphs 1-4, wherein the cellulose-based food casing comprises a fibrous reinforcement comprising an inside surface and an outside surface; and an outside layer on the outside surface of the fibrous reinforcement and/or an inside layer on the outside surface of the fibrous reinforcement; and wherein the outside layer and/or the inside layer comprises regenerated cellulose.

6. A cellulose-based food casing according to any one of paragraphs 1-5, wherein the cellulose-based food casing is a single layer viscose casing or a double layer viscose casing.

7. The cellulose-based food casing according to any one of paragraphs 5-6, wherein the cellulose-based food casing comprises an inside layer including alkenyl succinic anhydride.

8. A cellulose-based food casing according to any one of paragraphs 1-7, wherein the cellulose-based food casing comprises an inside surface and an outside surface; and the inside surface and/or the outside surface of the cellulose-based food casing is coated with alkenyl succinic anhydride.

9. A cellulose-based food casing according to any one of paragraphs 5-8, wherein alkenyl succinic anhydride is impregnated in the inside layer and/or the outside layer of the cellulose-based food casing.

10. A cellulose-based food casing according to any one of paragraphs 1-9, wherein alkenyl succinic anhydride is C8, C9, C10, C11, C12, C13, C14, C15, C16, C17, C18, C19, C20, C21, C22, C23, or C24-alkenyl succinic anhydride, or any mixture thereof.

11. A cellulose-based food casing according to any one of paragraphs 1-10, wherein the amount of alkenyl succinic anhydride in the cellulose-based food casing is up to about 1% by weight based on the total dry weight of regenerated cellulose contained in the cellulose-based food casing.

12. A cellulose-based food casing according to any one of paragraphs 1-11, wherein the amount of alkenyl succinic anhydride in the cellulose-based food casing is up to about 0.75%; or up to about 0.5%; or up to 0.25%; or up to 0.1%; or up to 0.06% by weight based on the total dry weight of regenerated cellulose contained in the cellulose-based food casing.

13. A cellulose-based food casing according to any one of paragraphs 1-12, wherein the cellulose-based food casing further comprises a stabilizing agent.

14. A cellulose-based food casing according to any one of paragraphs 1-13, wherein the cellulose-based food casing further comprises a stabilizing agent selected from the group consisting of starch, pectin, silica, one or more polyacrylamides, bentonite, one or more carboxymethyl celluloses, polyvinyl amine, polyvinyl alcohol, poly diallyl dimethyl ammonium chloride, galactoglucomannan, and polyamidoamine-epichlorohydrin.

15. A cellulose-based food casing according to paragraph 13 or 14, wherein the stabilizing agent is starch.

16. A cellulose-based food casing according to paragraph 15, wherein the stabilizing agent is cationic starch.

17. A cellulose-based food casing according to any one of paragraphs 1-16, wherein the cellulose-based food casing further comprises a peeling agent.

18. A cellulose-based food casing according to paragraph 17, wherein the peeling agent is selected from the group consisting of paraffin, paraffin wax, alkylketene dimer and polyalkylene glycol.

19. A method for the manufacture of the cellulose-based food casing according to any one of paragraphs 1-18, which method comprises the step of
impregnating or coating a cellulose-based food casing with a solution comprising alkenyl succinic anhydride.

20. The method according to paragraph 19, wherein the cellulose-based food casing is impregnated with a solution comprising alkenyl succinic anhydride admixed with regenerated cellulose.

21. The method according to paragraph 20, wherein the method comprises the steps of
a) admixing alkenyl succinic anhydride with regenerated cellulose to form a solution;
b) preparing a cellulose-based food casing by impregnating the inside surface and/or outside surface of a fibrous reinforcement with the solution obtainable from step a); and
c) coagulating and washing the cellulose-based food casing obtainable from step b).

22. The method according to paragraphs 20 or 21, wherein the amount of alkenyl succinic anhydride in the solution comprising alkenyl succinic anhydride admixed with regenerated cellulose is up to about 1% by weight based on the total dry weight of regenerated cellulose.

23. The method according to paragraph 19, wherein a cellulose-based food casing is coated with a solution comprising alkenyl succinic anhydride.

24. The method according to paragraph 19 or 23, wherein the method comprises the steps of
a) preparing a cellulose-based food casing by impregnating the inside surface and/or outside surface of a fibrous reinforcement with regenerated cellulose;
b) coagulating and washing the cellulose-based food casing obtainable from step a); and
c) coating the inside surface and/or the outside surface of the cellulose-based food casing obtainable from step b) with a solution comprising alkenyl succinic anhydride.

25. The method according to paragraph 21 or 24, wherein the method further comprises the step of
d) drying and/or curing the cellulose-based food casing.

26. The method according to paragraph 24 or 25, wherein step c) comprises coating the inside surface of the cellulose-based food casing with a solution comprising alkenyl succinic anhydride by internal bubble coating.

27. The method according to any one of paragraphs 19-26, wherein the solution comprising alkenyl succinic anhydride is an aqueous solution.

28. The method according to any one of paragraphs 19 or 23-27, wherein the concentration of alkenyl succinic anhydride in the solution comprising alkenyl succinic anhydride is in the range of about 1 to about 15 g/l.

29. The method according to any one of paragraphs 19 or 23-28, wherein the concentration of alkenyl succinic anhydride in the solution comprising alkenyl succinic anhydride is in the range of about 1 to about 4 g/l.

30. The method according to any one of paragraphs 19 or 23-29, wherein the concentration of alkenyl succinic anhydride in the solution comprising alkenyl succinic anhydride is in the range of about 4 to about 12 g/l.

31. The method according to any one of paragraphs 19 or 30, wherein the solution comprising alkenyl succinic anhydride further comprises a stabilizing agent.

32. The method according to paragraph 31, wherein the stabilizing agent is selected from the group consisting of starch, pectin, silica, one or more polyacrylamides, bentonite, one or more carboxymethyl celluloses, polyvinyl amine, polyvinyl alcohol, poly diallyl dimethyl ammonium chloride, galactoglucomannan, and polyamidoamine-epichlorohydrin.

33. The method according to paragraph 31 or 32, wherein the stabilizing agent is starch.

34. The method according to paragraph 33, wherein the concentration of starch in the solution comprising alkenyl succinic anhydride is in the range of about 0.4 to about 6 g/l.

35. The method according to paragraph 33 or 34, wherein the concentration of starch in the solution comprising alkenyl succinic anhydride is in the range of about 0.4 to about 1.7 g/l.

36. The method according to paragraph 33 or 34, wherein the concentration of starch in the solution comprising alkenyl succinic anhydride is in the range of about 1.6 to about 4.8 g/l.

37. The method according to any one of paragraphs 33-36, wherein the starch is cationic starch.

38. A cellulose-based food casing obtainable by the method according to any one of paragraphs 19-37.

The embodiments of the invention described hereinbefore may be used in any combination with each other. Several of the embodiments may be combined together to form a further embodiment of the invention. A product, a method or a use, to which the invention is related, may comprise at least one of the embodiments of the invention described hereinbefore.

EXAMPLES

In the following, the present invention will be described in more detail. The description below discloses some embodiments and examples of the invention in such detail that a person skilled in the art is able to utilize the invention based on the disclosure. Not all steps of the embodiments are discussed in detail, as many of the steps will be obvious for the person skilled in the art based on this specification. The following examples were carried out in a small-scale testing laboratory; however, a person skilled in the art is able to scale the examples as desired.

Example 1

ASA was formulated in solution for coating cellulose-based food casings. (2-alkenyl(C15-C21)) succinic anhydride (99% active material, Prequel™ 2000E, Ashland Inc., USA) was emulsified with cationic starch solution (solution at 20%, VECTOR® SCA, Roquette Freres S.A., France) in solutions, wherein the ratio of ASA to the starch solution ranged from 10/20 to 150/300 (w/w in grams) (Table 1). As a skilled person will understand, the concentration of ASA in aqueous solutions having compositions indicated in Table 1 ranges from about 1 g/l to about 15 g/l, and the concentration of starch ranges from about 0.4 g/l to about 6 g/l (dry weight % per liter).

TABLE 1

Composition of ASA/starch solutions

| ASA/starch ratio | x ASA | Starch % | ASA % | Glycerine % | Water Added % | Water et al % | Total % |
|---|---|---|---|---|---|---|---|
| 10/20 | 0.25 | 0.042 | 0.105 | 4.009 | 95.672 | 0.171 | 100 |
| 20/40 | 0.50 | 0.084 | 0.209 | 3.988 | 95.379 | 0.340 | 100 |
| 30/60 | 0.75 | 0.126 | 0.312 | 3.967 | 95.088 | 0.507 | 100 |
| 40/80 | 1.00 | 0.167 | 0.413 | 3.947 | 94.801 | 0.672 | 100 |
| 50/100 | 1.25 | 0.208 | 0.514 | 3.926 | 94.516 | 0.836 | 100 |
| 60/120 | 1.50 | 0.248 | 0.614 | 3.906 | 94.234 | 0.998 | 100 |
| 70/140 | 1.75 | 0.288 | 0.712 | 3.886 | 93.956 | 1.159 | 100 |
| 80/160 | 2.00 | 0.327 | 0.810 | 3.866 | 93.680 | 1.317 | 100 |
| 90/180 | 2.25 | 0.366 | 0.907 | 3.846 | 93.407 | 1.474 | 100 |
| 100/200 | 2.50 | 0.405 | 1.002 | 3.827 | 93.136 | 1.630 | 100 |
| 110/220 | 2.75 | 0.443 | 1.097 | 3.807 | 92.869 | 1.784 | 100 |
| 120/240 | 3.00 | 0.481 | 1.191 | 3.788 | 92.604 | 1.936 | 100 |
| 130/260 | 3.25 | 0.519 | 1.283 | 3.769 | 92.341 | 2.087 | 100 |
| 140/280 | 3.50 | 0.556 | 1.375 | 3.751 | 92.082 | 2.237 | 100 |
| 150/300 | 3.75 | 0.592 | 1.466 | 3.732 | 91.825 | 2.384 | 100 |

SVC and DVC casings were coated with solutions described in Table 1 by internal bubble coating and dried.

Example 2

Double layer viscose (DVC) casings were coated with ASA/starch solutions having ASA/starch ratios of 10/20, 40/80 and 20/40 as described in Example 1. A traditional DVC casing without ASA was employed as a reference casing. Such traditional DSV casings have typically not been accepted for pork/beef high temperature pepperoni because of grease and oil spots. DVC casing (ViskoTeepak size 1 DVC casing) was manufactured using a double layer viscose technique in which the casing was prepared by coating a fibrous layer on each side with viscose. The casing was subsequently treated by coagulation, regeneration, washing and drying steps using known methods.

Pork/beef pepperoni sausages were manufactured in a conventional manner with high temperature heating after fermentation at fully cooking temperature using both high humidity (HH) and low humidity (LH) processes.

The drying of the pepperoni sausages was measured in terms of yield % calculated as the percentage of the weight of the dried pepperoni sausage to the weight of the pepperoni sausage before drying; high yield % indicates poor/slow drying.

Casing separation was measured on a scale from 0 (no pre-release of casing) to 10 (full pre-release of casing).

Greasing out was measured on a scale from 0 (no greasing out) to 10 (high greasing out).

The results are shown in Table 2.

TABLE 2

| Sample | Yield % HH | Yield % LH | Casing separation HH | Greasing out HH | Casing separation LH | Greasing out LH |
|---|---|---|---|---|---|---|
| DVC, ASA/starch ratio 10/20 | 77.8 | 73.3 | 0.5 | 0.25 | 0.5 | 0 |
| DVC, ASA/starch ratio 40/80 | 74.1 | 73.5 | 0.1 | 0.1 | 0 | 0 |

TABLE 2-continued

| Sample | Yield % HH | Yield % LH | Casing separation HH | Greasing out HH | Casing separation LH | Greasing out LH |
|---|---|---|---|---|---|---|
| DVC, ASA/starch ratio 20/40 | 72.7 | 73.6 | 0.05 | 0 | 0 | 0 |
| DVC | 80.1 | 73.6 | 0.5 | 7 | 0.25 | 0 |

It was concluded that greasing out was very high in conventional DVC casings; greasing out has a direct impact on the yield %, i.e. the higher the greasing out, the slower the drying. Results obtained using traditional DVC casing in a high humidity process led to clearly unacceptable results, i.e. high greasing out and high yield % indicating slow drying. All DVC casings with ASA formulations were capable of reducing greasing out in DVC casings, since greasing out was very low in casings comprising ASA.

Example 3

High temperature pork/beef pepperoni sausages were manufactured in a conventional manner using four different cellulose-based food casings in order to determine a casing with optimal pre-release and minimal greasing out for applications in which pre-release towards the end of the manufacturing process is desirable.

Reference casing refers to a simple SVC casing which was not impregnated or coated with any additives.

Reference casing with AKD refers to a SVC casing coated with alkylketene dimer (AKD) and polyamine-polyamide-epichlorohydrin resin by internal bubble coating.

Reference casing with PEG refers to a DVC casing manufactured by injecting polyethylene glycol (PEG, molecular weight of about 35000 g/mol) at a concentration of 5% by weight, based on dry regenerated viscose cellulose of the casing, in the viscose to obtain an outside viscose stream; and polyamine-polyamide-epichlorohydrin at a concentration of 0.1% by weight, based on dry regenerated viscose cellulose of the casing, to obtain an inside viscose stream; by impregnating a tubular fibrous web with viscose by applying to the inside of the tubular fibrous web the inside viscous stream and to the outside of the tubular fibrous web the outside viscose stream. The reference casing with PEG was further subjected to coagulation, regeneration, washing and drying steps. The manufacture of this casing is described in more detail in the publication US 2012/0052223.

Casing with ASA/starch ratio 40/80 refers to a SVC casing coated with ASA/starch solution having an ASA/starch ratio of 40/80 as described in Example 1.

Pre-release was measured on a scale in which a value close to 10 indicates significant pre-release at the end of the manufacturing process.

Greasing out was measured on a scale from 0 (no greasing out) to 10 (high greasing out).

The results are shown in Table 3.

TABLE 3

| Sample | Pre-release (0-10) | Greasing out (0-10) | General evaluation |
|---|---|---|---|
| Ref. casing with AKD | 0 | 0 | Not suitable |
| Ref. casing | 7 | 3 | Performance inconsistent, some greasing out |
| Ref. casing with PEG | 7 | 1 | Performance inconsistent, some greasing out |
| Casing with ASA/starch ratio 40/80 | 9 | 0.25 | Performance consistent, little greasing out |

The results indicated that the reference casing with AKD showed no pre-release and thus was deemed unsuitable for applications that require pre-release. The reference casing and the reference casing with PEG both showed some pre-release but also some greasing out.

The reference casings also exhibited inconsistent behaviour, i.e. different portions or batches of casing could exhibit varying behaviour in terms of pre-release and greasing out. Such inconsistent behaviour may cause significant problems in a highly controlled and optimized sausage manufacturing process.

In contrast, the casing comprising ASA showed optimal pre-release and very little greasing out in a consistent manner.

Example 4

High temperature pork/beef pepperoni sausages were stuffed to the same diameter and manufactured in a conventional manner using the four different cellulose-based food casings described in Example 3 in order to determine peel forces required to remove the casings from the surface of the sausages.

Reference casing with PEG in this Example refers to a SVC casing manufactured by injecting polyethylene glycol (PEG, molecular weight of about 35000 g/mol) at a concentration of 5% by weight, based on dry regenerated viscose cellulose of the casing, in the viscose to obtain an outside viscose stream; by impregnating a tubular fibrous web with viscose by applying to the outside of the tubular fibrous web the outside viscose stream. The reference casing with PEG was further subjected to coagulation, regeneration, washing and drying steps. The manufacture of this casing is described in more detail in the publication US 2012/0052223.

For measuring peel forces, a strip having a width of 2 cm was cut in the casing in the longitudinal direction of the sausage. A dynamometer was connected to first end of said strip, and the dynamometer connected to the first end of the strip was pulled towards the second end of said strip in the longitudinal direction of the sausage. Maximum and average peel forces were measured. The results are shown in Table 4.

TABLE 4

| Sample | Evaluation after cooking | Yield % after 9 days | Peel force seam max (N/2 cm) | Peel force average (N/2 cm) | Peel force opposite max (N/2 cm) | Peel force opposite average (N/2 cm) |
|---|---|---|---|---|---|---|
| Ref. casing with AKD | No grease out | 71.8 | 0.55 | 0.3 | 0.6 | 0.4 |
| Casing with ASA/starch ratio 40/80 | No grease out | 71.9 | 0 | 0 | 0 | 0 |
| Ref. casing with PEG | Grease out | 73.5 | 1.5 | 0.5 | 1.1 | 0.5 |
| Ref. casing | Grease out | 72.7 | 1.95 | 0.6 | 1.1 | 0.4 |

Reference casing (without additives) and reference casing with PEG displayed some grease out, while casing comprising ASA and casing comprising AKD did not. The fact that reference casing without additives also displayed significant greasing out indicates that the conditions of the experiment was performed in conditions that favoured greasing out; this further demonstrates that casings comprising ASA display greatly reduced greasing out even in conditions in which conventional casings perform poorly.

Furthermore, in contrast to the other casings, the casing comprising ASA required virtually nonexistent peel forces due to optimal pre-release, and would thus be highly suitable for automated peelers. The other casings would be impossible or at least very difficult to peel automatically due to e.g. significant greasing out.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A tubular cellulose-based food casing comprising: regenerated cellulose; and alkenyl succinic anhydride, comprising bound and non-bound alkenyl succinic anhydride,
   wherein the bound alkenyl succinic anhydride is bound to the regenerated cellulose, wherein the cellulose-based food casing comprises an inside surface and an outside surface, and the inside surface of the cellulose-based food casing is coated or impregnated with the alkenyl succinic anhydride,
   wherein the amount of the alkenyl succinic anhydride in the cellulose-based food casing is in the range of about 0.001% to about 1% by weight based on the total dry weight of the regenerated cellulose contained in the cellulose-based food casing, and
   wherein the cellulose-based food casing is suitable for use as a casing for sausage products, and
   wherein the alkenyl succinic anhydride is a C8, C9, C10, C11, C12, C13, C14, C15, C16, C17, C18, C19, C20, C21, C22, C23 or C24-alkenyl succinic anhydride, or any mixture thereof.

2. A cellulose-based food casing according to claim 1, wherein the cellulose-based food casing comprises:
   a fibrous reinforcement comprising an inside surface and an outside surface; and
   at least one of an outside layer on the outside surface of the fibrous reinforcement and an inside layer on the inside surface of the fibrous reinforcement,
   wherein the at least one of the outside layer and the inside layer comprises regenerated cellulose.

3. A cellulose-based food casing according to claim 2, wherein at least some of the alkenyl succinic anhydride is impregnated in the outside layer of the cellulose-based food casing.

4. A cellulose-based food casing according to claim 1, wherein the cellulose-based food casing is a single layer viscose casing or a double layer viscose casing.

5. A cellulose-based food casing according to claim 1, wherein the outside surface of the cellulose-based food casing is coated with at least some of the alkenyl succinic anhydride.

6. A cellulose-based food casing according to claim 1, wherein the cellulose-based food casing further comprises a stabilizing agent.

7. A cellulose-based food casing according to claim 6, wherein the stabilizing agent comprises at least one of starch, pectin, silica, one or more polyacrylamides, bentonite, one or more carboxymethyl celluloses, polyvinyl amine, polyvinyl alcohol, poly diallyl dimethyl ammonium chloride, galactoglucomannan, and polyamidoamine-epichlorohydrin.

8. A cellulose-based food casing according to claim 1, wherein the cellulose-based food casing further comprises a peeling agent.

9. A cellulose-based food casing obtained by impregnating or coating the inside surface of a tubular cellulose-based food casing comprising regenerated cellulose with a solution comprising alkenyl succinic anhydride and a stabilizing agent,
   wherein in the cellulose-based food casing comprises alkenyl succinic anhydride, the alkenyl succinic anhydride comprising bound and non-bound alkenyl succinic anhydride, wherein the bound alkenyl succinic anhydride is bound to the regenerated cellulose, and
   wherein the alkenyl succinic anhydride is a C8, C9, C10, C11, C12, C13, C14, C15, C16, C17, C18, C19, C20, C21, C22, C23 or C24-alkenyl succinic anhydride, or any mixture thereof, and
   wherein the cellulose-based food casing is suitable for use as a casing for sausage products, and the amount of alkenyl succinic anhydride in the cellulose-based food casing is in the range of from about 0.001% to about 1% by weight based on the total dry weight of the regenerated cellulose contained in the cellulose-based food casing.

10. The cellulose-based food casing of claim 9, wherein at least some of the alkenyl succinic anhydride is bound to the regenerated cellulose via a covalent bond resulting from a chemical reaction between the at least some of the alkenyl succinic anhydride and the regenerated cellulose.

11. A cellulose-based food casing according to claim 9, wherein the stabilizing agent is starch, pectin, silica, one or more polyacrylamides, bentonite, one or more carboxymethyl celluloses, polyvinyl amine, polyvinyl alcohol, poly diallyl dimethyl ammonium chloride, galactoglucomannan, or polyamidoamine-epichlorohydrin.

12. A combination of a tubular cellulose-based food casing and a sausage enclosed therein, comprising;
   a food casing of regenerated cellulose;
   alkenyl succinic anhydride comprising bound and non-bound alkenyl succinic anhydride, wherein the bound alkenyl succinic anhydride is bound to the regenerated cellulose, and
   wherein the alkenyl succinic anhydride is a C8, C9, C10, C11, C12, C13, C14, C15, C16, C17, C18, C19, C20, C21, C22, C23 or C24-alkenyl succinic anhydride, or any mixture thereof, and
   wherein the food casing comprises an inside and an outside surface, the inside surface of the food casing is impregnated or coated with the alkenyl succinic anhydride, and the amount of alkenyl succinic anhydride in the food casing is in the range of about 0.001% to about 1% based on the total dry weight of the regenerated cellulose contained in the food casing.

* * * * *